US008801376B2

(12) United States Patent
Eleftheriou et al.

(10) Patent No.: US 8,801,376 B2
(45) Date of Patent: Aug. 12, 2014

(54) FABRICATED INTERMEDIATE CASE WITH ENGINE MOUNTS

(75) Inventors: Andreas Eleftheriou, Woodbridge (CA); David Menheere, Georgetown (CA); Quantai Liu, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 523 days.

(21) Appl. No.: 13/224,379

(22) Filed: Sep. 2, 2011

(65) Prior Publication Data

US 2013/0058778 A1 Mar. 7, 2013

(51) Int. Cl.
*F01D 25/14* (2006.01)

(52) U.S. Cl.
USPC ............ 415/213.1; 415/215.1; 415/220

(58) Field of Classification Search
USPC .................... 415/213.1, 215.1, 220
See application file for complete search history.

(56) References Cited

U.S. PATENT DOCUMENTS

| | | | |
|---|---|---|---|
| 2,591,399 A | 4/1952 | Buckland et al. | |
| 4,063,847 A | 12/1977 | Simmons | |
| 4,716,721 A | 1/1988 | Pask et al. | |
| 5,088,279 A * | 2/1992 | MacGee | 60/226.1 |
| 5,277,382 A | 1/1994 | Seelen et al. | |
| 5,288,204 A * | 2/1994 | Adams | 415/182.1 |
| 5,443,229 A | 8/1995 | O'Brien et al. | |
| 5,483,792 A | 1/1996 | Czachor et al. | |
| 5,485,723 A | 1/1996 | McCoy et al. | |
| 5,516,258 A | 5/1996 | Newton | |
| 6,012,684 A | 1/2000 | Umney et al. | |
| 6,059,524 A | 5/2000 | Costa et al. | |
| 6,206,631 B1 | 3/2001 | Schilling | |
| 6,305,899 B1 | 10/2001 | Saunders | |
| 6,371,721 B1 | 4/2002 | Sathianathan et al. | |
| 6,394,746 B1 | 5/2002 | Sathianathan et al. | |
| 6,575,694 B1 | 6/2003 | Thompson et al. | |
| 6,708,482 B2 | 3/2004 | Seda | |
| 6,843,449 B1 | 1/2005 | Manteiga et al. | |
| 6,883,303 B1 | 4/2005 | Seda | |
| 7,195,452 B2 * | 3/2007 | Allan et al. | 415/135 |
| 7,229,249 B2 | 6/2007 | Durocher et al. | |
| 7,266,941 B2 | 9/2007 | Eleftheriou et al. | |
| 7,329,097 B2 | 2/2008 | Kirk | |
| 7,370,467 B2 | 5/2008 | Eleftheriou et al. | |
| 7,527,220 B2 | 5/2009 | Dron | |
| 7,565,796 B2 | 7/2009 | Eleftheriou et al. | |
| 7,594,405 B2 | 9/2009 | Somanath et al. | |
| 7,634,916 B2 | 12/2009 | Mace et al. | |
| 7,739,866 B2 | 6/2010 | Eleftheriou et al. | |
| 7,765,787 B2 | 8/2010 | Eleftheriou et al. | |
| 7,793,488 B2 | 9/2010 | Eleftheriou et al. | |
| 7,797,922 B2 | 9/2010 | Eleftheriou et al. | |
| 8,128,021 B2 | 3/2012 | Suciu et al. | |
| 2007/0246603 A1 | 10/2007 | Udall et al. | |
| 2008/0072566 A1 * | 3/2008 | Eleftheriou et al. | 60/226.1 |

* cited by examiner

*Primary Examiner* — Igor Kershteyn
(74) *Attorney, Agent, or Firm* — Norton Rose Fulbright Canada LLP

(57) ABSTRACT

A fabricated engine case has a plurality of circumferentially spaced struts radially extending between an outer case and an inner case. A mount apparatus is affixed to the outer case of the engine case. The mount apparatus is a mount base radially spaced apart from a circumferential skin of the outer case and a load bearing member extending radially inwardly to connect the mount base to an outer end of one of the struts.

17 Claims, 4 Drawing Sheets

FABRICATED INTERMEDIATE CASE WITH ENGINE MOUNTS

TECHNICAL FIELD

The described subject matter relates generally to gas turbine engines, and more particularly to a fabricated engine case with engine mounts.

BACKGROUND OF THE ART

An intermediate case of a gas turbine engine is located between a fan case and a downstream section of the engine case to provide support for a compressor section of the engine (may include a compressor shroud in some cases). Engine mounts may be provided on an intermediate case for mounting the engine to an aircraft. Most intermediate cases are made by a casting process and thus are heavy, especially for smaller gas turbine engines.

Accordingly, there is a need to provide an improved intermediate case of a gas turbine engine.

SUMMARY

In one aspect, the described subject matter provides a fabricated engine case of a gas turbine engine, comprising an annular outer case, an annular inner case disposed co-axially within the outer case and a plurality of circumferentially spaced struts radially extending between the outer and inner cases, the struts being affixed to the respective outer and inner cases; and a mount apparatus affixed to the outer case for mounting the engine to an aircraft, the mount apparatus including a mount base having opposed first and second sides, the first side providing an engine mounting surface and the second side being substantially radially spaced apart from a circumferential skin of the outer case to define a gap between the mount base and the skin, the mount base being supported on respective front and rear ends of the outer case, the apparatus further including a load bearing member extending radially through the gap between the second side of the mount base and the circumferential skin of the outer case, the load bearing member connecting the mount base to one of the struts.

In another aspect, the described subject matter provides a fabricated engine case of a gas turbine engine, comprising an annular outer case, an annular inner case disposed co-axially within the outer case and a plurality of circumferentially spaced struts radially extending between the outer and inner cases, the struts being affixed to the respective outer and inner cases, the outer case including a circumferential skin and axially spaced first and second flanges extending radially and outwardly from the circumferential skin; and a mount apparatus affixed to the outer case for mounting the engine to an aircraft, the mount apparatus including a mount base located axially between and supported on the first and second flanges, the mount base having a first side providing an engine mounting surface and a second side opposite to the first side, the second side being substantially radially spaced apart from the circumferential skin of the outer case to define a gap between the mount base and the skin, the apparatus further including a load bearing member extending radially through the gap between the second side of the mount base and the circumferential skin of the outer case, and connecting the mount base to one of the struts.

Further details of these and other aspects of the described subject matter will be apparent from the detailed description and drawings included below.

BRIEF DESCRIPTION OF THE DRAWINGS

Reference is now made to the accompanying drawings depicting aspects of the described subject matter, in which.

It will be noted that throughout the appended drawings, like features are identified by like reference numerals.

DETAILED DESCRIPTION

Figure 1:
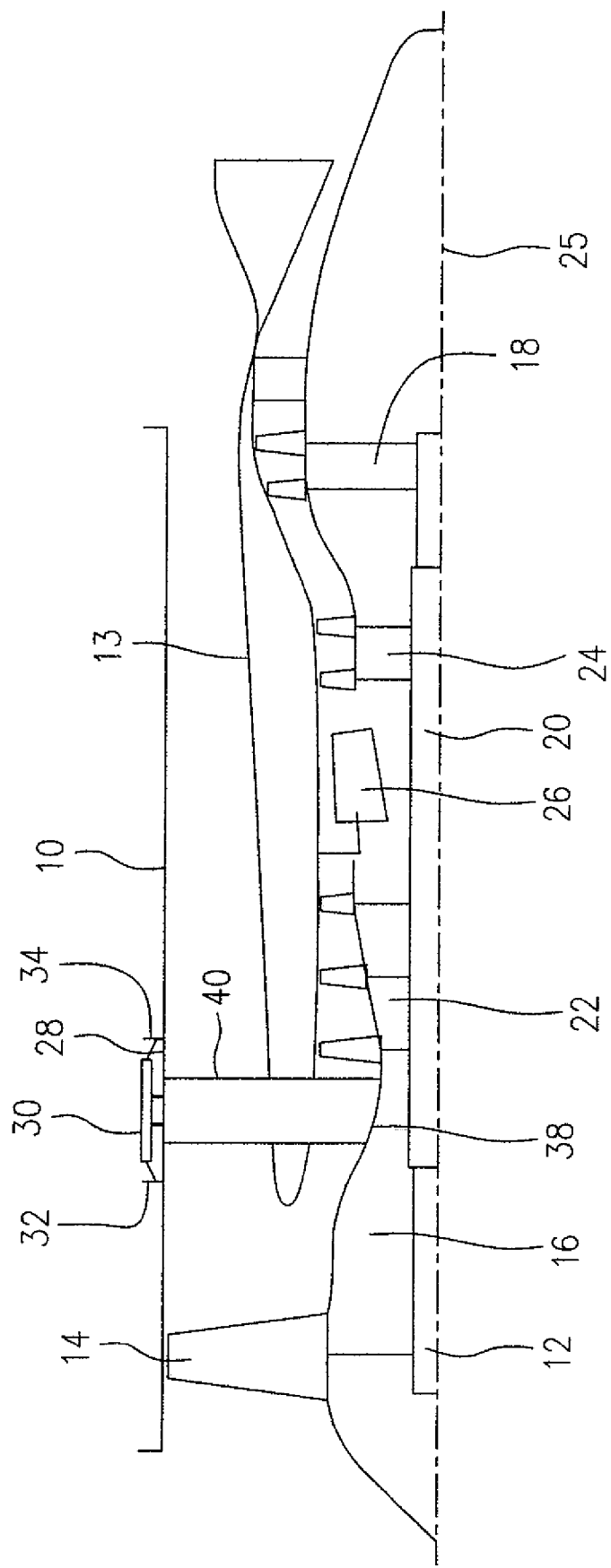
FIG. 1 is a schematic illustration of a turbofan gas turbine engine incorporating one embodiment of the described subject matter.

Referring to FIG. 1, a turbofan gas turbine engine which is an exemplary application of the described subject matter includes an engine outer case 10, a core case 13, a low pressure spool assembly (not indicated) which includes a fan assembly 14, a low pressure compressor assembly 16 and a low pressure turbine assembly 18 connected by a shaft 12, and a high pressure spool assembly (not indicated) which includes a high pressure compressor assembly 22 and a high pressure turbine assembly 24 connected by a turbine shaft 20. The core case 13 surrounds the low and high pressure spool assemblies to define a main fluid path (not numbered) therethrough. The high and low pressure spool assemblies co-axially define a rotational engine axis 25 of the engine. A combustor 26 generates combustion gases in the main fluid path to power the high and low pressure turbine assemblies 24, 18 in rotation about the engine axis 25. A mount apparatus 30 is affixed to an intermediate case 28 which is a section of the engine outer case 10.

It should be noted that the terms "radial", "axial" and "circumferential" used throughout this specification and appended claims, unless otherwise specified, are with respect to the engine axis 25.

Figure 4:
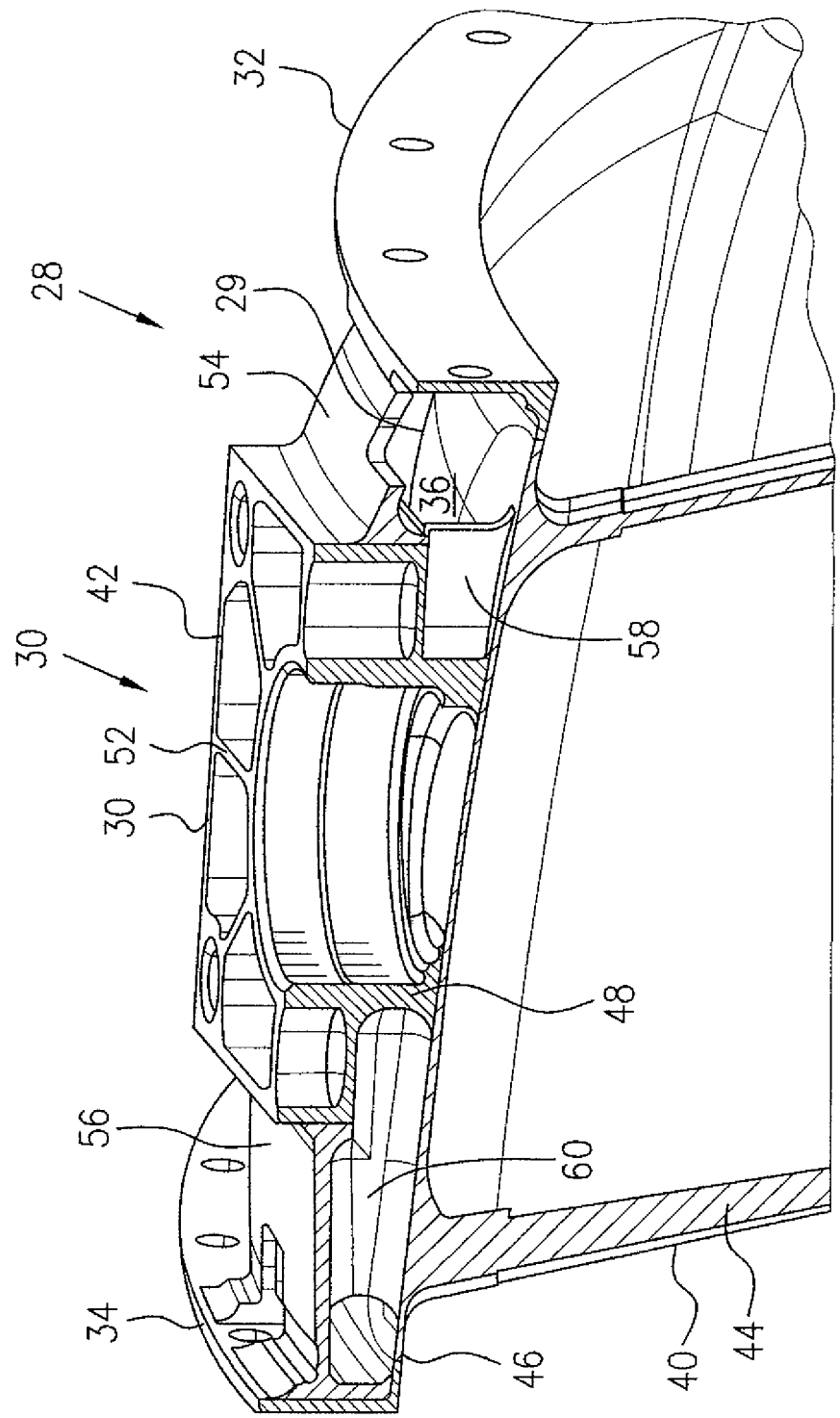
FIG. 4 is a partial cross-sectional view of the intermediate case of FIG. 2, showing inner details of the mount apparatus.

Referring to FIGS. 1-4, the intermediate case 28 according to one embodiment, is a section of the engine outer case 10, located downstream of a fan case (not numbered) and is connected through for example, front and rear flanges 32, 34 to the fan case and a downstream section of the engine outer case 10, respectively. It should be noted that the intermediate case 28 in FIG. 4 is oppositely disposed in an axial direction with respect to its axial orientation in the engine as illustrated in FIG. 1. The intermediate case 28 in accordance with one embodiment, includes an annular outer case 29 including for example a circumferential skin 36 of sheet metal extending radially between the respective front and rear flanges 32, 34 which are machined metal components welded to the skin 36. The intermediate case 28 further includes an annular inner case 38 coaxially disposed within the outer case 29 and a plurality of circumferentially spaced struts 40 radially extending between the outer and inner cases 29 and 38. The struts 40 are affixed, for example by welding, to the respective outer and inner cases 29, 38. The inner case 38 is supported on one of the shafts 20, 12, for example by a bearing assembly and other support structures (not shown).

The mount apparatus 30 which is affixed to the outer case 29 for mounting the engine to an aircraft, includes for example a mount base 42 having opposed sides 43 and 45. Side 43 provides an engine mounting surface and side 45 is substantially radially spaced apart from the circumferential skin 36 of the outer case 29 to define a gap between the mount base 42 and the skin 36. The mount base 42 may be supported on the respective annular front and rear flanges 32, 34 which according to this embodiment form the respective front and rear ends of the outer case 29. The mount apparatus 30 further includes a load bearing member (not numbered) extending radially through the radial space (the gap) between side 45 of the mount base 42 and the skin 36 of the outer case 29, to connect the mount base 42 to one of the struts 40. Therefore, the mount base 42 is supported only on said one of the struts 40 and the flanges 32, 34, independent from the skin 36 of the outer case 29, which will be further described hereinafter.

The struts 40 according to one embodiment, may include a hollow airfoil section 44 which may be formed in a casting or forging process. At least the one of the struts 40 which is directly connected to the mount base 42 of the mount apparatus 30, includes an outer end portion (not numbered) having a circumferentially extending platform 46. The platform 46 closes the hollow airfoil section 44 at the outer end thereof and is fitted within an opening (not numbered) defined in the skin 36 of the outer case 29. The platform 46 is affixed for example by welding, to the skin 36 of the outer case 29, thereby securing the strut 40 to the outer case 29. The outer end portion of the strut 40 may further include a tubular member 48 radially extending from the platform 46 into the mount base 42 and affixed thereto, thereby forming the load bearing member. The mount apparatus 30 together with the outer end portion of the at least one of the struts 40, according to one embodiment, may form a one-piece component.

The mount base 42 according to one embodiment, may include peripheral walls 50, for example defining a square or rectangular shape which surrounds a portion of the tubular member 48. A plurality of internal ribs 52 affixed to the respective peripheral walls 50 extends inwardly to connect the tubular member 48. The tubular member 48 is integrated with both the platform 46 of the strut 40 and the mount base 42 of the mount apparatus 30. Therefore, the tubular member 48 may be made as an integral part of the mount base 42 rather than part of the outer end portion of the strut 40. For example, the tubular member 48 together with the peripheral walls 50 and internal ribs 52, may be made as an integrally machined component having a hollow configuration. The hollow configuration of the mount base 42 may have a closed bottom (as shown in FIG. 4) except the tubular member 48 which extends radially downwardly to connect, for example by welding, with the platform 46 of the strut 40.

The mount apparatus 30 according to one embodiment may include two support plates 54, 56 radially spaced apart from the skin 36 of the outer case 29 and axially extending between the mount base 42 and the front flange 32 and between the mount base 42 and the rear flange 34, respectively. This connection is achieved, for example in a welding process by which the support plates 54, 56 are welded at one end thereof to the respective peripheral walls 50 of the mount base 42 and are welded at the other end thereof to the respective front and rear flanges 32, 34. The load bearing member according to one embodiment, may further include one or two axially oriented walls 58, 60 extending radially between the circumferentially extending platform 46 of the strut 40 and the closed bottom of the mount base 42. The axially oriented walls 58 and 60 may also be affixed to the tubular member 48, for example by welding. The axially oriented walls such as wall 60, may have in an axial length extending into an under side (not numbered) of a support plate such as support plate 56 and may be affixed thereto for example by welding.

The intermediate case 28 may include more than one mount base 42 each of which will be located to circumferentially align with one of the struts 40 and will have a configuration similar to that described above.

Figure 2:
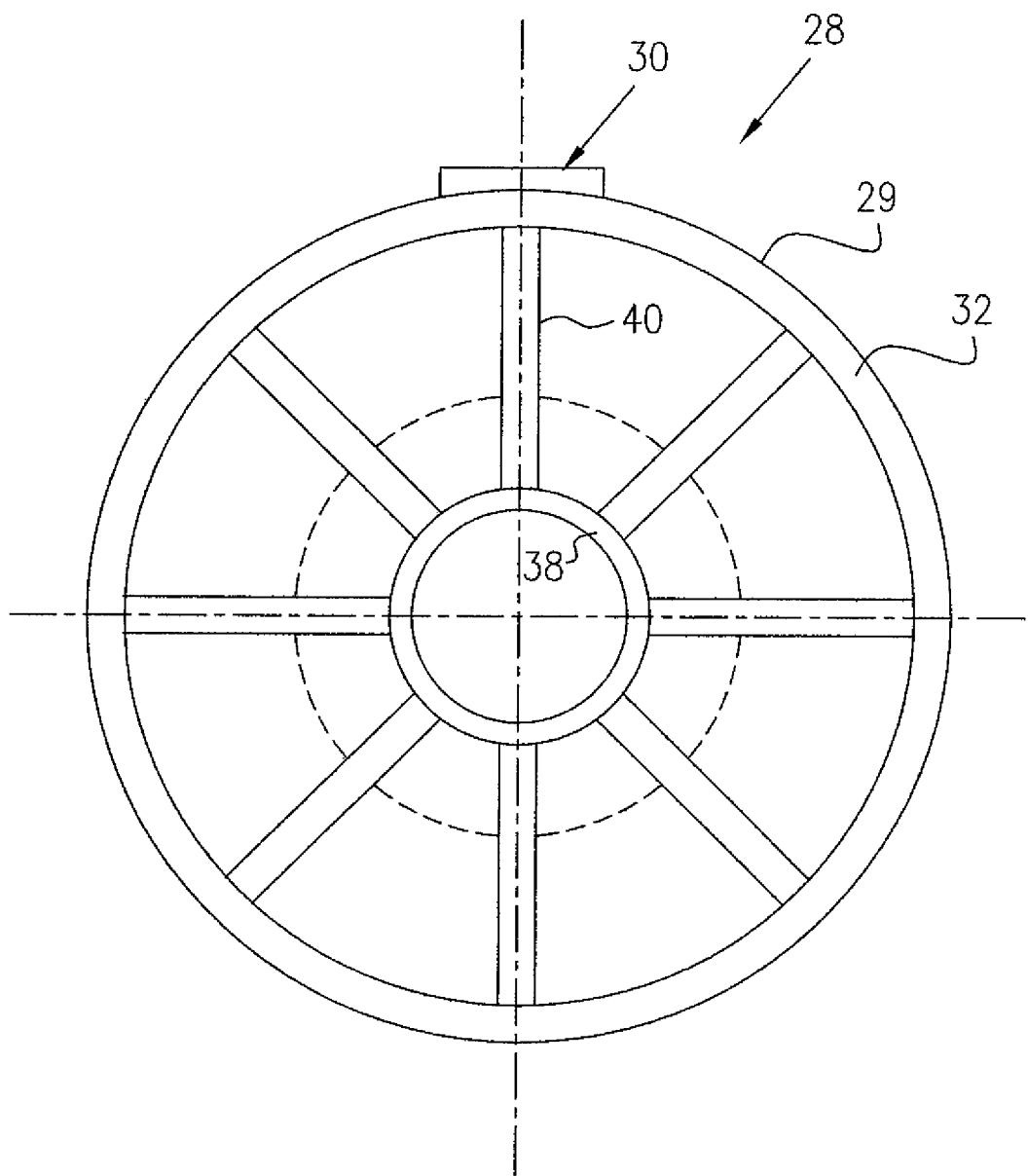
FIG. 2 is a simplified front elevational view of an intermediate case used in the engine of FIG. 1.
Figure 3:
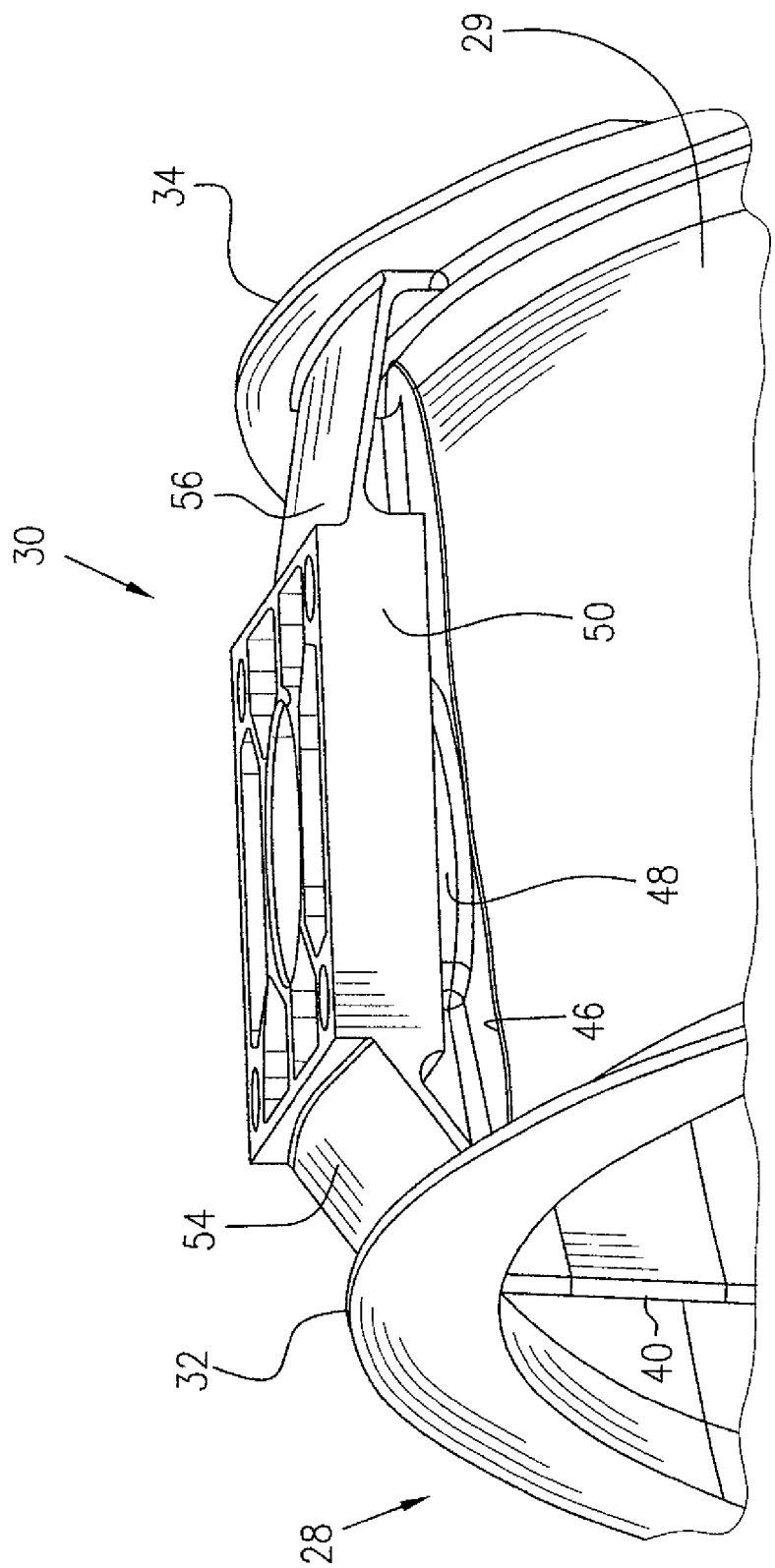
FIG. 3 is a partial perspective view of the intermediate case of FIG. 2, showing an integral mount apparatus provided on the intermediate case.

It should be understood that the intermediate case as illustrated in the drawings, is simplified to illustrate the features of the described subject matter and that the described subject matter is applicable to intermediate cases which include for example a middle ring as shown in broken lines in FIG. 2 and/or other components which are not part of the described subject matter.

The mount apparatus 30 is a simple configuration which bears and distributes strut loads and blade off-loads effectively because the mount base 42 is connected directly to the strut 40 over which it is located, rather than being connected to the skin 36 of the outer case 29. The mount base 42 which is positioned spaced apart from the sheet metal skin 36 of the outer case 29 provides additional stiffness to the outer case 29.

The above description is meant to be exemplary only, and one skilled in the art will recognize that changes may be made to the embodiments described without departure from the scope of the described subject matter. For example, although a hollow airfoil configuration of the strut is described, it should be understood that the above-described mount apparatus is applicable to an intermediate case having otherwise configured struts. The particular configuration of the outer end portion of the strut and the mount base are described as embodiments of the described subject matter which may vary from the illustrated configurations. Although the described mount apparatus is attached to an intermediate case of a turbofan gas turbine engine, it should be understood that the described mount apparatus can be attached to an engine casing structure which is not an intermediate case but has a similar configuration. The radial flanges which support the mount base are axially spaced apart and affixed to the outer case, but may not necessarily be located at the respective front and rear ends of the outer case. The mount base may be supported on the outer case by means other than the axially spaced flanges. Still other modifications which fall within the scope of the described subject matter will be apparent to those skilled in the art, in light of a review of this disclosure, and such modifications are intended to fall within the appended claims.

The invention claimed is:

1. A fabricated engine case of a gas turbine engine, comprising:
    an annular outer case, an annular inner case disposed co-axially within the outer case and a plurality of circumferentially spaced struts radially extending between the outer and inner cases, the struts being affixed to the respective outer and inner cases; and
    a mount apparatus affixed to the outer case for mounting the engine to an aircraft, the mount apparatus including a mount base having opposed first and second sides, the first side providing an engine mounting surface and the second side being substantially radially spaced apart from a circumferential skin of the outer case to define a gap between the mount base and the skin, the mount base being supported on respective front and rear ends of the outer case, the apparatus further including a load bearing member extending radially through the gap between the second side of the mount base and the circumferential skin of the outer case, the load bearing member connecting the mount base to one of the struts.

2. The fabricated engine case as defined in claim 1 wherein the circumferential skin of the outer case is of sheet metal, extending axially between first and second annular flanges, the first and second annular flanges being affixed to and radially, outwardly extending from the respective front and rear ends of the outer case.

3. The fabricated engine case as defined in claim 2 wherein the mount apparatus comprises first and second support plates radially spaced apart from the circumferential skin of the outer case and axially extending between the mount base and the first flange and between the mount base and the second flange, respectively.

4. The fabricated engine case as defined in claim 1, wherein the mount base comprises peripheral walls defining a periphery of the mount base, and ribs interconnecting the peripheral walls and the load bearing member.

5. The fabricated engine case as defined in claim 4, wherein the periphery of the mount base defined by the peripheral walls, surrounds a portion of the load bearing member.

6. The fabricated engine case as defined in claim 1, wherein said load bearing member comprises a radial outer end of said one of the struts, the radial outer end radially, outwardly projecting from the circumferential skin of the outer case.

7. The fabricated engine case as defined in claim 1, wherein said one of the struts comprises a hollow airfoil section and an outer end portion extending radially and outwardly through the circumferential skin of the outer case and connecting the hollow airfoil section to the mount base.

8. The fabricated engine case as defined in claim 7, wherein the outer end portion of said one of the struts comprises a tubular member radially extending into the mount base.

9. The fabricated engine case as defined in claim 7, wherein the outer end portion of said one of the struts comprises a circumferentially extending platform fitted within and affixed to an opening in the circumferential skin of the outer case.

10. A fabricated engine case of a gas turbine engine, comprising:
an annular outer case, an annular inner case disposed co-axially within the outer case and a plurality of circumferentially spaced struts radially extending between the outer and inner cases, the struts being affixed to the respective outer and inner cases, the outer case including a circumferential skin and axially spaced first and second flanges extending radially and outwardly from the circumferential skin; and
a mount apparatus affixed to the outer case for mounting the engine to an aircraft, the mount apparatus including a mount base located axially between and supported on the first and second flanges, the mount base having a first side providing an engine mounting surface and a second side opposite to the first side, the second side being substantially radially spaced apart from the circumferential skin of the outer case to define a gap between the mount base and the skin, the apparatus further including a load bearing member extending radially through the gap between the second side of the mount base and the circumferential skin of the outer case and connecting the mount base to one of the struts.

11. The fabricated engine case as defined in claim 10, wherein the mount apparatus comprises first and second support plates radially spaced apart from the circumferential skin of the outer case and extending axially, the first support plate connecting the mount base to the first flange and the second support plate connecting the mount base to the second flange.

12. The fabricated engine case as defined in claim 10 wherein an outer end of said one of the struts comprises a platform extending circumferentially and being fitted within and affixed to an opening in the circumferential skin of the outer case.

13. The fabricated engine case as defined in claim 10, wherein the load bearing member comprises a tubular member projecting radially and inwardly from the mount base and being affixed to an outer end of said one of the struts.

14. The fabricated engine case as defined in claim 10, wherein the load bearing member comprises at least one axially oriented wall extending radially between an outer end of said one of the struts and the mount base.

15. The fabricated engine case as defined in claim 10, wherein the load bearing member comprises a tubular member and an axially oriented wall, the tubular member projecting radially and inwardly from the mount base and being affixed to an outer end of said one of the struts, and the axially oriented wall being affixed to the tubular member and extending radially between the outer end of said one of the struts and the mount base.

16. The fabricated engine case as defined in claim 10, wherein the circumferential skin is of sheet metal.

17. The fabricated engine case as defined in claim 10, wherein first and second flanges are affixed to front and rear ends of the outer case, respectively.

* * * * *